July 30, 1935.  W. W. HUNT  2,009,583
TRAP FOR INSECTS AND RODENTS
Filed July 11, 1934

INVENTOR.
William W. Hunt.

Patented July 30, 1935

2,009,583

UNITED STATES PATENT OFFICE 2,009,583

TRAP FOR INSECTS AND RODENTS

William W. Hunt, St. Louis, Mo.

Application July 11, 1934, Serial No. 734,565

3 Claims. (Cl. 43—121)

This invention relates to improvements in traps for insects and rodents, and more particularly to an improved and simplified light weight trap structure, so designed as to induce and facilitate the entrance of rodents and insects, while preventing their escape when once entrapped.

A general object of the present invention is to provide an improved trap of cage type, into which animals and insects are effectively lured by food or otherwise, and in which they may be destroyed, the trap being of such construction as to facilitate cleaning and the maintenance of all parts of the structure in a sanitary condition.

An additional object of the invention is obtained in an improved, easily fabricated entrance structure, so designed as to facilitate and induce the entrance of the animal life to be entrapped, and at the same time providing a sturdy rigid structure susceptible of economical assembly, and which may be formed entirely of stock materials.

Figure 1:
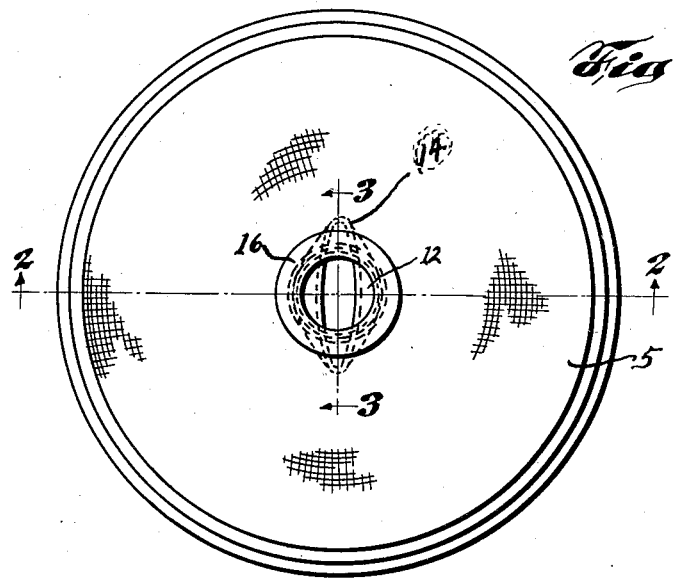
Figure 2:
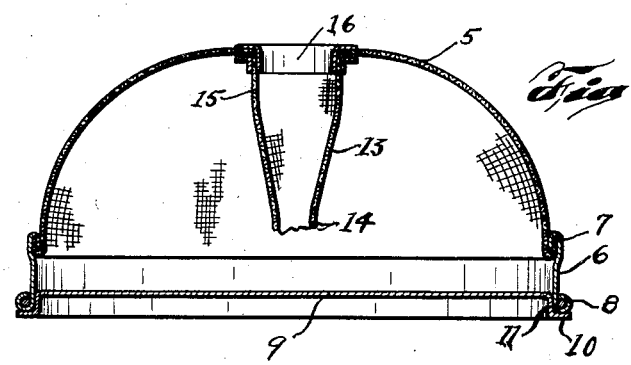
Figure 3:
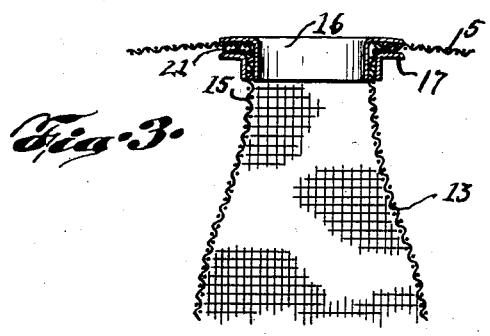
Figure 4:
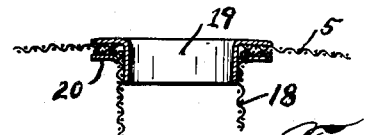

Further advantages and objectives of the invention will be in part expressed and in part implied by reference to the following specification and the accompanying drawing, in which:

Fig. 1 is a top or plan view of a combination insect and rodent trap embodying the major features of my invention; Fig. 2 is a vertical sectional elevation as viewed along a plane corresponding to line 2—2 of Fig. 1; Fig. 3 is an enlarged sectional detail of an entrance tube structure such as shown by Figs. 1 and 2, and Fig. 4 is a fragmentary sectional elevation of an entrance tube structure of slightly modified form.

My preference in embodying the invention is to provide a cage or body formed of wire cloth or similar material such as screen wire, the body of the cage being indicated at 5. The inverted bowl shape, or dome-like aspect results in an open lower side, which, for purposes of strengthening and preserving the shape of the body, is marginally secured, as by crimping, to a circular band 6, the crimped joint being indicated at 7. The reinforcing band or rim 6 is provided about its lower extremity with a roll edge or bead 8.

As a bottom closure and bait pan, there is provided a preferably circular imperforate element 9, the outer margins of which are flanged as at 10, and the adjacent angular portion 11 of which serves closely to engage the inner surface portion of bead 8, whereby the pan 9 is detachably and frictionally associated with the body or cage structure.

Disposed, by preference, centrally or axially of the bowl-like cage structure, is an entrance port 12 of a sectional area or diameter suitable for the access of small rodents and insects. Depending from the entrance port, centrally or axially of the cage 5, is a tube 13. Although this element may be formed of any reasonably flexible light material, it is my preference to utilize a reticulate metal consisting say of screen, wire cloth or the like, conveniently corresponding to the material constituting the body or cage 5. As best appears from Fig. 2, the tube 13 is somewhat constricted or converging in sectional area or diameter between its outer and inner ends. This sectional area may obviously be initially determined according to the requirements of the trap. For example, in case the structure is utilized for roaches, water bugs or like insects, the inner end 14 of the entrance tube is advisedly constricted to assume an elongate oval section such as shown by dotted lines, Fig. 1. For entrapment of small rodents such as mice, the end 14 may be enlarged to approximate a circular section, appropriate alteration or adjustment being easily made from time to time to care for animal life of different sizes.

I am aware that screen wire cages have heretofore been employed in forming traps for insects. Protracted experiments indicate however that a vast difference exists in the effectiveness of such traps under similar conditions, and that such differences are due primarily to differences in form and structure of the avenues of ingress. As a result of the comparisons aforesaid, I have evolved an entrance structure which in use has proven substantially more effective for its intended purpose than others heretofore offered to the trade or known in the art.

An entrance tube of sheet metal of non-reticulate nature has been found, as a result of side-by-side comparisons with the traps herein disclosed, to be relatively unattractive to insects. This is probably due in part to a lack of foot-hold as the insect descends the tube, resulting in an instinctive reluctance to undertake such descent. Screen wire entrance portions of older form, if attempted to be constituted by integral portions of the cage body, are difficult or impossible to form without extreme distortion of the wire cloth, often resulting in breakage of the material.

In the trap embodying the present invention I have attained a desirable rigidity of entrance structure, and have provided at the same time, an entrance tube which is attractive to the insects to be entrapped. The advantages, for the present purpose, of wire cloth or screen are realized by the utilization of this material in forming the tube proper, say by rolling the wire cloth and securing the overlapped margins of the tube material by wire staples (not shown).

The outer or large end 15 of the tube is internally engaged by a grommet 16, which may be formed of metal, rubber, or other suitable material, the washer-like portion of the grommet lying in a plane transverse to the axis of the tube 13, being located exteriorly of and surrounding the entrance port so as to constitute a facing or framing therefor. According to Figs. 2 and 3, the outer end of tube 13 is exteriorly embraced by an additional grommet 17. The tubular or sleeve part of grommet 17 is brought to register with the corresponding portion of grommet 16, and the washer-like flange portion of grommet 17 is brought to bear against the inner surface of the cage wall about the port 12. The diameters of the sleeve portions of the grommets are so selected that, with the wire of tube 13 therebetween, the tube is securely gripped and positioned thereby, and when the grommets are forced together in assembly, their washer-like portions embrace and grip therebetween the material of the cage wall lying about the entrance port, so that the tube, grommets and entire entrance structure are firmly positioned in assembly.

An alternate form of securement structure is illustrated by Fig. 4, in which a tube 18 and grommet 19 are or may be related similarly to parts 13 and 16 of Figs. 2 and 3. A difference is noted however in that, in Fig. 4, a washer 20 is substituted for the grommet 17, being sleeved over the tube and inner grommet, and clampingly securing the two wire cloth elements in assembly.

In either of the arrangements illustrated, the outer end margin of tubes 13 and 18 may be swaged or flanged as at 21, altho a satisfactorily rigid structure results without such a flange, which, at a saving in production costs, is omitted from the traps now in manufacture.

In the use of the trap, a bait selected according to the life to be lured, is disposed on the bait pan; the trap is then closed, disposed in or near a runway, and after the insects are collected, the trap and contents are conveniently submerged in scalding water or a suitable solution. Discharge of the contents, followed by liquid treatment for sanitation, render the trap ready for rebaiting and further use.

It will appear from the description of parts of the device and their assembly, that the entire structure may be constructed of stock materials, at low cost, and that the trap fully attains each of the several objects heretofore enumerated and implied.

Since the embodiments of the invention herein described and illustrated are susceptible of many changes in the parts, their combinations and manner of assembly, the description is not to be understood as limiting the invention, the scope of which is defined by the claims hereunto appended.

I claim as my invention:

1. An entrance structure for an insect or animal cage provided with an entrance port, the structure including an entrance tube of metal projecting inwardly of the port, and a pair of coacting clamping elements engaging each other in sleeved relation, the elements frictionally and clampingly receiving therebetween, an end portion of the entrance tube and a portion of the cage wall disposed about the port.

2. An entrance structure for an insect and animal cage provided with an entrance port, the structure including an entrance tube of reticulate material projecting inwardly of the port, a grommet forming an exterior facing for the port, a washer structure embracing a portion of the grommet, the grommet and washer structure clampingly embracing the outer end portion of the entrance tube and the wall material about the port, whereby to secure the entrance tube in assembled relation to the cage.

3. An entrance structure for an insect and animal cage of wire cloth type and provided with an entrance port, the structure including an entrance tube formed of wire cloth and extending from the port toward the interior of the cage, a pair of grommets having portions of differential diameter, the smaller thereof being telescopically received by the larger, the outer end of the entrance tube and the cage material about said entrance port being grippingly received between, and frictionally positioned in assembled relation by the grommets, the outermost grommet constituting a smooth framing or facing exterior of the cage wall about the entrance port.

WILLIAM W. HUNT.